US011417188B2

(12) United States Patent
Dubey

(10) Patent No.: US 11,417,188 B2
(45) Date of Patent: Aug. 16, 2022

(54) CONTROL OF VEHICLE STATUS DISPLAY FOR OCCUPANT THREAT REDUCTION

(71) Applicant: Toyota Motor North America, Inc., Plano, TX (US)

(72) Inventor: Kumar Gaurav Dubey, Plano, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/911,550

(22) Filed: Jun. 25, 2020

(65) Prior Publication Data

US 2021/0407271 A1 Dec. 30, 2021

(51) Int. Cl.
| | |
|---|---|
| *G08B 21/02* | (2006.01) |
| *G08G 1/0968* | (2006.01) |
| *G08B 3/10* | (2006.01) |
| *B60R 25/31* | (2013.01) |
| *B60R 25/104* | (2013.01) |
| *B60R 25/102* | (2013.01) |
| *B60R 25/01* | (2013.01) |
| *B60R 25/10* | (2013.01) |

(52) U.S. Cl.
CPC ............. *G08B 21/02* (2013.01); *B60R 25/01* (2013.01); *B60R 25/102* (2013.01); *B60R 25/104* (2013.01); *B60R 25/31* (2013.01); *G08B 3/10* (2013.01); *G08G 1/0968* (2013.01); *B60R 2025/1013* (2013.01)

(58) Field of Classification Search
None
See application file for complete search history.

(56) References Cited

U.S. PATENT DOCUMENTS

| | | | | |
|---|---|---|---|---|
| 5,455,716 | A * | 10/1995 | Suman | G07C 9/00182 |
| | | | | 359/872 |
| 6,028,537 | A * | 2/2000 | Suman | B60K 35/00 |
| | | | | 340/988 |
| 8,519,838 | B2 | 8/2013 | Walsh et al. | |
| 8,643,507 | B2 | 2/2014 | Rodriguez et al. | |
| 8,970,699 | B2 * | 3/2015 | Xiao | B60R 1/00 |
| | | | | 348/148 |
| 10,421,437 | B1 * | 9/2019 | Koskan | G08B 21/0261 |
| 10,515,489 | B2 * | 12/2019 | Jefferies | B60R 25/24 |
| 10,572,740 | B2 | 2/2020 | Ribeiro et al. | |
| 10,832,699 | B1 * | 11/2020 | McFarland, Jr. | G10L 25/57 |
| 11,014,532 | B2 * | 5/2021 | Weber | B60W 30/188 |

(Continued)

FOREIGN PATENT DOCUMENTS

CN 103057518 A 4/2013
EP 1877829 A2 12/2007

*Primary Examiner* — Fekadeselassie Girma
(74) *Attorney, Agent, or Firm* — Christopher G. Darrow; Darrow Mustafa PC

(57) ABSTRACT

A system for a system for controlling a vehicle fuel-level display includes one or more processors and a memory communicably coupled to the one or more processors and storing a fuel-level display control module. The module includes computer-readable instructions that when executed by the one or more processors cause the one or more processors to, responsive to generation of a control signal, control operation of the vehicle so as to cause the fuel-level display to display a predetermined false low-fuel level.

12 Claims, 2 Drawing Sheets

(56) References Cited

U.S. PATENT DOCUMENTS

| | | | |
|---|---|---|---|
| 2007/0079793 A1* | 4/2007 | Cook | F02M 37/10 |
| | | | 123/198 D |
| 2008/0026671 A1* | 1/2008 | Smith | A63H 17/36 |
| | | | 446/456 |
| 2014/0240111 A1 | 8/2014 | Kleve et al. | |
| 2014/0371599 A1* | 12/2014 | Wu | A61B 5/4082 |
| | | | 600/476 |
| 2020/0098272 A1* | 3/2020 | Manberg | G08G 5/0008 |

* cited by examiner

CONTROL OF VEHICLE STATUS DISPLAY FOR OCCUPANT THREAT REDUCTION

TECHNICAL FIELD

The subject matter described herein relates to control of a vehicle operating status display, specifically a fuel-level display, so as to create conditions enabling a driver to escape a threatening situation.

BACKGROUND

Drivers and some occupants of a vehicle may be threatened by carjacking, kidnapping, physical violence from one or more other vehicle occupants. When the vehicle is operating and the driver is being watched, it may be difficult to pull over or to attract the attention of other vehicles or pedestrians to communicate a need for assistance.

SUMMARY

In one aspect of the embodiments described herein, a system for a system for controlling a vehicle fuel-level display is provided. The system includes one or more processors and a memory communicably coupled to the one or more processors and storing a fuel-level display control module. The module includes computer-readable instructions that when executed by the one or more processors cause the one or more processors to, responsive to generation of a control signal, control operation of the vehicle so as to cause the fuel-level display to display a predetermined false low-fuel level.

In another aspect of the embodiments described herein, a method is provided for controlling a vehicle fuel-level display. The method includes a step of, responsive to a control signal, controlling operation of a vehicle so as to cause the fuel-level display to display a predetermined false low-fuel level.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system for controlling a vehicle fuel-level display. The system incorporates a fuel-level display control module which, responsive to generation of a control signal, controls operation of the vehicle so as to cause the fuel-level display to display a predetermined false low-fuel level. The control signal may be generated manually by activation a button or switch, or by speaking a key word or phrase. The control signal may also be generated automatically by a threat detection module which monitors and interprets vehicle sensor data relating to the occupant compartment to detect potential threats. Responsive to generation of the control signal, the vehicle may also determine a route to a closest re-fueling location and either autonomously drive the vehicle toward and to the location, or provide directions for manual driving to the location. The ability to prompt display of a false low-fuel level when a threat is perceived may afford the driver an excuse for driving the vehicle to a closest re-fueling location as soon as possible, to avoid the need to pull the vehicle over for lack of fuel. This may enable the driver to attract the attention of someone at the re-fueling location or enable the driver to escape.

Figure 1:
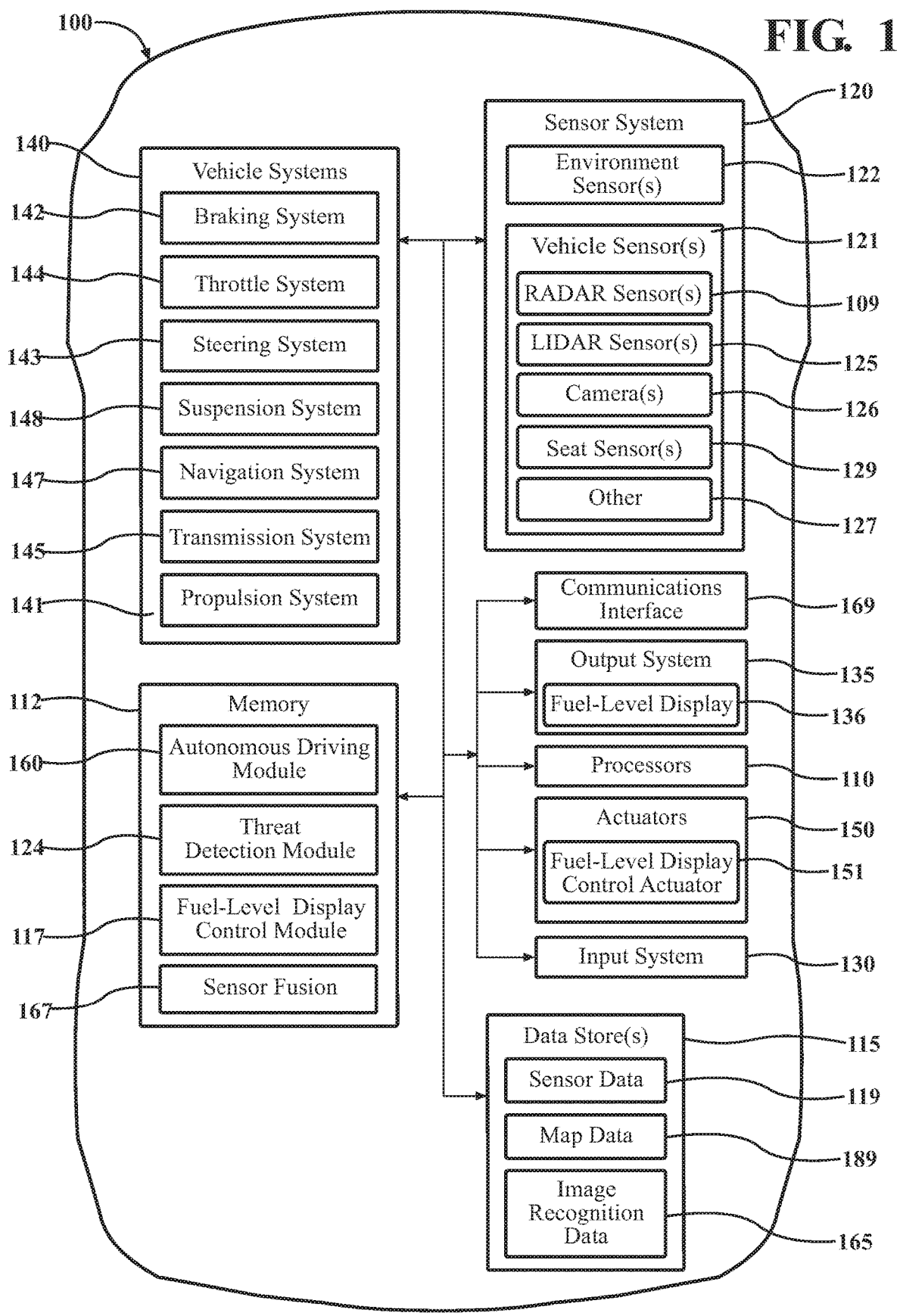
FIG. 1 is a block schematic diagram of a vehicle incorporating a system for controlling a vehicle fuel-level display in accordance with embodiments described herein.

Referring to FIG. 1, an example of a vehicle 100 is illustrated. As used herein, a "vehicle" is any form of motorized transport. In one or more implementations, the vehicle 100 is a conventional passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a system for controlling a vehicle fuel-level display, in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

The one or more data stores 115 can include image recognition data. The image recognition data may be used by a threat detection module in processing sensor data to detect the presence and identities of known vehicle occupants, occupant configurations and/or positions which may indicate threat conditions, and other pertinent conditions.

In one or more arrangements, the one or more data stores 115 can include map data 189. The map data 189 can include maps of one or more geographic areas. In some instances, the map data 189 can include information or data on roads, traffic control devices, road markings, structures, features of interest, and/or landmarks in the one or more geographic areas. The map data 189 can be in any suitable form. In some instances, the map data 189 can include aerial views of an area. In some instances, the map data 189 can include ground views of an area, including 360-degree ground views. The map data 189 can include measurements, dimensions, distances, and/or information for one or more items included in the map data 189 and/or relative to other items included in the map data 189. The map data 189 can include a digital map with information about road geometry, road grades and slopes, and other road information, including information about the road on which the vehicle 100 is currently traveling. The map data 189 can be high quality and/or highly detailed. In one or more arrangements, the map data 189 may be updated continuously (i.e., as soon as information relating to revisions becomes available) or regularly from a cloud source or other source exterior of the vehicle.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 2).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data. Sensor system 120 may include sensors configured to detect the current state or status of vehicle systems and components and to generate indications (for example, using trouble codes) possible malfunctions of vehicle systems and components. The existence of the various predetermined conditions described herein may be calculated or otherwise determined using sensor data.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can include radar sensor(s) 109, LIDAR sensor(s) 125, camera(s) 126, and other sensors 127 configured for scanning the occupant compartment. Seat sensors 129 may be configured to detect the numbers and positions of seated occupants. The vehicle sensors may be configured to detect the number and sizes of occupants and may detect any movements of occupants within the passenger compartment. The vehicle sensors may be configured to detect or determine the position of each occupant inside the occupant compartment and positions of the occupants relative to each other.

In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle. The vehicle sensor(s) 121 may include a fuel-level sensor configured to detect a fuel level of the vehicle.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, other vehicles, etc. As an example, in one or more arrangements, the environment sensors 122 can include one or more radar sensors, one or more LIDAR sensors, one or more cameras, and/or other types of sensors. Environment sensors 122 may be configured to detect aspects of road geometry, road grade/slope, traffic conditions, movements and characteristics of other vehicles, and other external events and conditions. Environment sensors 122 may be configured to detect the presence of traffic control elements such as traffic lights, signage, etc., and to interpret and process any indications or messages conveyed by such elements.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the occupant compartment or in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. Information such as sensor data, traffic information, road condition information, weather information, and other types of information may be transmitted and received via the communications interface 169. If required, wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a microphone and voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote user. The output system may include various status displays for vehicle operating parameters such as speed, fuel-level, engine oil, etc. A fuel-level display 136 may be an analog mechanical display, such as a dial indicator, or a digital display.

Figure 2:
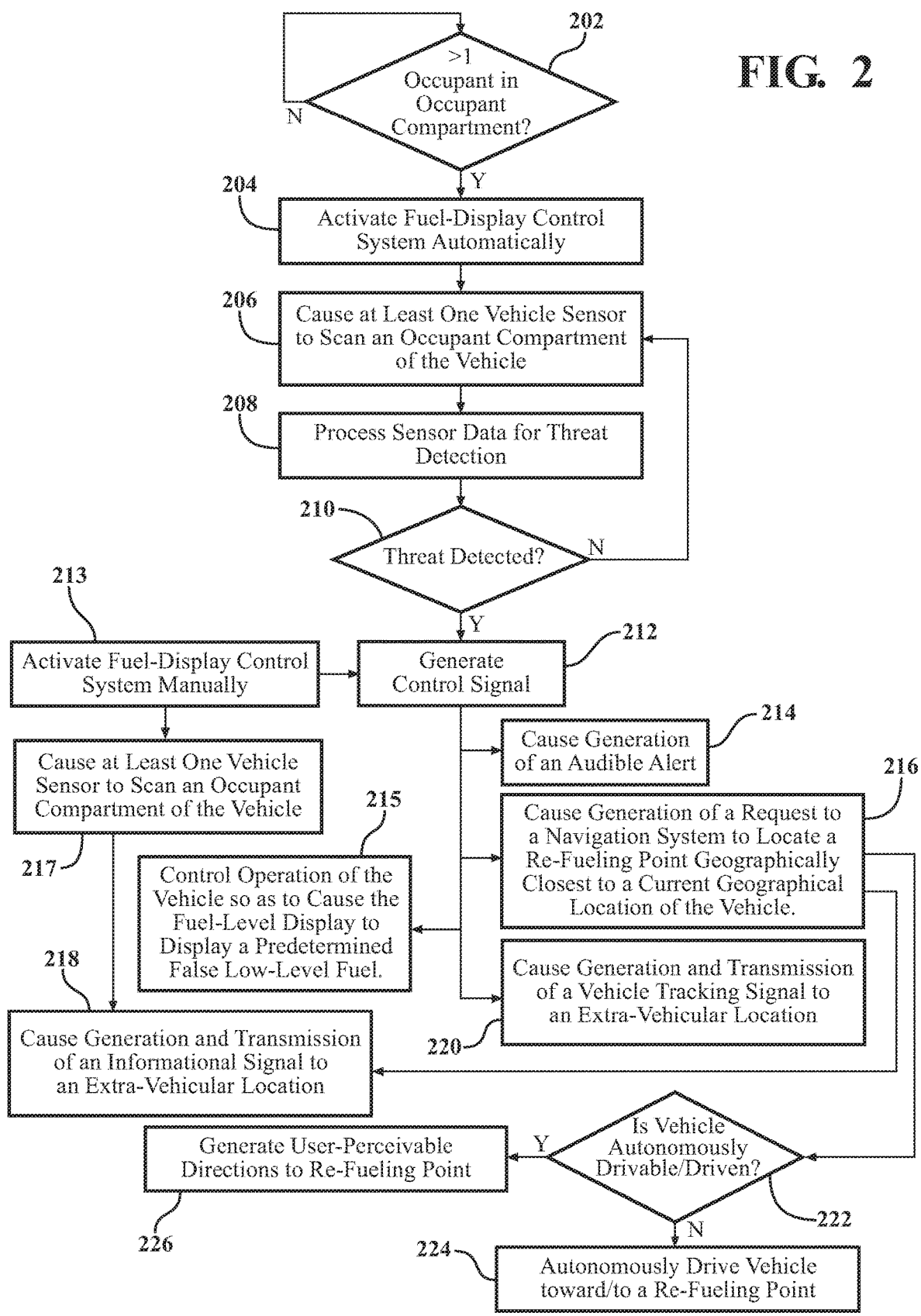
FIG. 2 is a flow diagram illustrating operation of a system for controlling a vehicle a fuel-level display in accordance with embodiments described herein.

The vehicle 100 can include one or more vehicle systems, collectively designated 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

Actuators 150 may include an actuator 151 for controlling the fuel-level display 136 responsive to generation of the fuel-level display control signal by the fuel-level display control module 117. The actuator 151 may be an element, system or mechanism structured and configured according to the type of fuel-level display (mechanical, electrical, etc.) incorporated into the vehicle 100, to control a fuel-level reading output by the display. The actuator 151 may be configured to control operation of the display 136 to display a predetermined false low-fuel level responsive to the control signal. Thus, the actuator 151 acts to temporarily override or supersede an element, system or mechanism that normally controls operation of the display to show an actual fuel level of the vehicle. In one or more arrangements, the value of the false fuel-level to be displayed may be specified by a vehicle user.

In embodiments described herein, a memory 112 may store an autonomous driving module 160, a threat detection module 124, and a fuel-level display control module 117. The memory 112 is a random-access memory (RAM), read-only memory (ROM), a hard-disk drive, a flash memory, or other suitable memory for storing the modules 160, 124, and 117. The modules 160, 124, and 117 are, for example, computer-readable instructions that when executed by the processor 110, cause the processor(s) 110 to perform the various functions disclosed herein. Additional modules (not shown) may also be stored in memory 112.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle so as to drive the vehicle along a travel route, from an initial or start location to a destination.

The processor(s) 110, the autonomous driving module 160, the threat detection module 124, the fuel-level display control module 117 and/or other modules described herein can be operably connected to communicate with each other and with the other elements of the vehicle, including various vehicle systems 140 and/or individual components thereof. For example, referring to FIG. 1, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, the fuel-level display control module 117 and/or other elements of the vehicle may control some or all of the vehicle systems 140 and, thus, may be partially or fully autonomous.

The processor(s) 110, the autonomous driving module(s) 160, and the navigation system 147 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 may incorporate a system for controlling a vehicle fuel-level display. The system may include a fuel-level display control module 117 stored in memory 112 and including computer-readable instructions that when executed by the one or more processors cause the one or more processors to, responsive to a control signal, control operation of the vehicle so as to cause the fuel-level display to display a predetermined false low-fuel level. "Control of operation of the vehicle" includes control of any and all systems and/or components of the vehicle, whether individually or in combination, required to perform a given task. Thus, depending on the vehicle configuration and other pertinent factors, the fuel-level display may be controlled by one or more signals originating from the fuel-level display control module, or the fuel-level display may be controlled by a combination of vehicle elements and/or systems acting in cooperation to cause the fuel-level display to display a predetermined false low-fuel level.

Any of a variety of methods may be used to cause generation of the control signal. In one operational mode, the control signal is generated responsive to manual activation of the fuel-level display control system. The system may be activated by a switch, button, or other user-operable system activation mechanism positioned in an occupant compartment of the vehicle and configured to be operable to cause generation of the control signal. The switch/button may be positioned on the steering wheel or in another location readily accessible by an occupant in the driver seat. The button/switch may also be usable to turn off the fuel-level display control system, if desired. When the fuel-level display control system is turned off, the fuel-level display may automatically return to showing the actual, accurate fuel-level. In addition, all signaling and other functions managed or caused by the system may be stopped.

In another aspect, the fuel-level display control system may be activated and the control signal generated responsive to user utterance of a key word or phrase which may be conveyed to the fuel-level display control system or to another vehicle system or component via the vehicle input system. The fuel-level display control system may be configured to recognize the key phrase and (optionally) the voice of one or more selected users. After voice activation of the system, control may flow as previously described with respect to manual system activation by switch/button.

In one operational mode, the control signal may be generated responsive to a threat determined to exist in the vehicle occupant compartment. In one or more arrangements, a threat detection module incorporated into the vehicle may cause the control signal to be generated autonomously in response to a determined threat. The threat detection module may be stored in memory 112 and may include computer-readable instructions that when executed by the one or more processors cause the one or more processors to determine, using data from at least one scan of a vehicle occupant compartment by at least one vehicle sensor, the presence or absence of a potential threat to an occupant in the occupant compartment. The threat detection module may operate in communication with the sensor fusion algorithm 167 to analyze the sensor data. Responsive to determination of the presence of a threat, the threat detection module may cause the control signal to be generated.

The threat detection module may incorporate a variety of algorithms and routines directed to recognition of any of numerous threat scenarios. For example, facial recognition routines may enable recognition of an owner and/or frequent occupant of the vehicle. Image recognition and other routines may operate in cooperation with facial recognition to distinguish between known vehicle occupants and unknown occupants. These routines may be operable in cooperation with vehicle sensors such as seat sensors, internal radar sensors, internal cameras, etc. to determine relative positions of the known and unknown occupants in the compartment, the proximity of unknown occupants to known occupants, the number of occupants, and other pertinent information. Image recognition routines may be configured to identify key circumstances (such as one occupant pointing a gun or other weapon at another occupant, for example) and to classify such circumstances as threats. When a threat is determined, the threat detection module may cause the control signal to be generated. For example, in one or more arrangements, the threat detection module 124 may be configured to activate the fuel-display control system automatically responsive to detection by vehicle sensors 121 of more than one person in the occupant compartment. The module 124 may then evaluate conditions to detect a possible threat.

In one or more arrangements the fuel-level display control module 117 may be configured to, responsive to generation of the control signal, control the vehicle 100 to generate one or more of the same perceivable vehicle reactions (such as sounds, flashing lights, and other reactions) that would be produced in an actual low-fuel level situation. The vehicle may also be controlled in additional ways as described herein.

For example, the fuel-level display control module may, responsive to generation of the control signal, cause generation of an audible alert configured to indicate that the fuel-level display is displaying the predetermined false low-fuel level. In one or more arrangements, the audible alert may be configured to have the same sound, content, etc. as an actual low-fuel level alert of the vehicle. In one or more arrangements, the fuel-level display control module may be configured to control operation (or to cause operation) of the same sound-generation means used in the vehicle to cause an actual low-fuel level alert.

In one or more arrangements, the fuel-level display control module may, responsive to generation of the control signal, cause at least one vehicle sensor to scan an occupant compartment of the vehicle. In one example, the control signal may cause a vehicle camera sensor to scan the vehicle interior responsive to automatic or manual activation of the fuel-level display control system. Scan data may be forwarded to the threat detection module for determination of a possible threat condition. If it is determined that a threat exists, information relating to the situation may be recorded and/or forwarded to responders.

The fuel-level display control module may also, be configured to, responsive to generation of the control signal, cause generation of a request to the vehicle or extra-vehicular navigation system to locate a re-fueling point geographically closest to a current geographical location of the vehicle. If the vehicle is being manually driven, the navigation system may provide user-perceptible (i.e., audible, visual, etc.) directions to the closest re-fueling point. If the vehicle is being autonomously driven, the navigation system may then autonomously drive the vehicle toward and to the closest re-fueling point. Manual control of the vehicle may be assumed by the driver at any time. The navigation system may be configured to, if the driver assumes manual control of the vehicle from an autonomous mode, generate user-perceptible directions to the closest re-fueling point if these have not already been provided.

The fuel-level display control module may be configured to, responsive to generation of the control signal, cause generation and transmission of an informational signal to an extra-vehicular location. In one or more arrangements, the informational signal may include information such as camera images, threat assessments and other derived from one or more scans of the occupant compartment, vehicle and owner/driver identification information, the location of the closest re-fueling point toward which the vehicle is driving, and any other information pertinent to the detected threat situation. The informational signal may be directed to a law-enforcement agency, for example.

The fuel-level display control module may be configured to, responsive to generation of the control signal, cause generation and transmission of a vehicle tracking signal to an extra-vehicular location. The tracking signal may include current navigational coordinates of the vehicle 100 and may be constantly or periodically updated and re-transmitted. This signal may enable the vehicle to be tracked by law enforcement.

The fuel-level display control system may be activated automatically using any suitable criteria as a trigger condition. In a particular embodiment, the system may be activated automatically responsive to the presence of more than one person in the occupant compartment, as detected by one or more vehicle sensors. For example, in one or more arrangements, the threat detection module 124 may be configured to activate the fuel-display control system automatically responsive to detection by vehicle sensors 121 of more than one person in the occupant compartment. Another possible trigger condition is the entry of an additional person into the occupant compartment at a location other than the driver seat when the vehicle is stopped with the engine running and the vehicle is located at a location which is not a residence of the vehicle owner. A user may set the fuel-level display control system to automatically activate when the trigger condition occurs. The user may also turn off this function, so that the fuel-level display control system does not automatically activate when the trigger condition occurs. The fuel-level display control system may be configured to enable user-selection of one or more trigger conditions using the input system 130.

FIG. 2 is a flow diagram illustrating operation of a system for controlling a vehicle fuel-level display in accordance with an embodiment described herein. In blocks 202 and 204, the fuel-level display control system may be activated automatically (i.e., without direct user input) responsive to detection by vehicle sensors 121 of more than one person in the occupant compartment at the same time. For example, activation of more than one seat sensor by seating of associated multiple occupants may activate the fuel-level display control system. In one or more particular arrangements, as seen in block 202, the system may be set by a user to automatically activate if, at any time during use of the vehicle, one or more additional occupants (other than the driver) enter the vehicle. Any auto-activation function may be enabled manually by a user prior to operation of the vehicle. Any auto-activation function may be selectable by the user as a default setting to activate the system whenever the vehicle is used. Alternatively, as described herein, the fuel-level display control system may be activated manually.

Upon activation of the system, the threat-detection module may (in block 206) cause at least one vehicle sensor to scan the occupant compartment of the vehicle. In addition, after the fuel-level display control system has been activated, the threat-detection module may control operation of the sensors to continually or periodically actively scan the occupant compartment for possible threats. The threat-detection module may then (in block 208), either continuously or after every scan, process sensor data for threat detection. If no current threat is detected in block 210, control may pass back to block 206 to continue scanning and analysis as described with respect to blocks 206-210 until a threat is detected or until the system is turned off. However, if a threat is detected, the threat-detection module may (in block 212) cause generation of a fuel-level display control signal.

Responsive to generation of the control signal, the fuel-level display control module may (in block 214) control operation of the vehicle to cause generation of an audible alert. At the same time, the fuel-level display control module may (in block 220) control operation of the vehicle to cause generation and transmission of a vehicle tracking signal to an extra-vehicular location. This may enable the vehicle to be tracked (for example, via a global positioning (GPS) signal). Also, at the same time as generation of the audible alert and tracking signal, the fuel-level display control module may (in block 215) control operation of the vehicle so as to cause the fuel-level display to display a predetermined false low-fuel level. Also, at the same time as generation of the audible alert and tracking signal, the fuel-level display control module may (in block 216) control operation of the vehicle to cause generation of a request to the vehicle navigation system to locate a re-fueling point geographically closest to a current geographical location of the vehicle.

After location of the re-fueling point geographically closest to the current geographical location of the vehicle, the fuel-level display control module may control operation of the vehicle to (in block 218) cause generation and transmission of an informational signal as previously described to an extra-vehicular location. Information in the informational signal may include the location of the re-fueling point geographically closest to the current geographical location of the vehicle, and may also be used to apprise responders of user background information, the current situation inside the vehicle, and other useful information.

Simultaneously with performance of block 218, the fuel-level display control module may control operation of the vehicle to (in block 222) determine if the vehicle 100 is autonomously drivable or being autonomously driven. If the vehicle 100 is autonomously drivable or being autonomously driven, the autonomous driving module 160 may operate in conjunction with the navigation system 147 to control operation of the vehicle to (in block 224) autonomously drive the vehicle toward closest re-fueling point. However, if the vehicle 100 is not autonomously drivable or being autonomously driven, the fuel-level display control module may cooperate with the navigation system 147 to (in block 226) generate user-perceivable driving directions to the closest re-fueling point. These directions may be relayed to the driver via, for example, the output system.

The ability to prompt display of a false low-fuel level when a threat is perceived may afford the driver an excuse for driving the vehicle to a closest re-fueling location as soon as possible, to avoid the need to pull the vehicle over for lack of fuel. This may enable the driver to attract the attention of someone at the re-fueling location or enable the driver to escape.

Referring now to block 213, the fuel-level display control system may also be activated manually, for example, by a driver pushing a button or activating a switch on the steering wheel or the utterance of a key word or phrase. In particular embodiments, the fuel-level display control system may be activated using a concealed switch or button accessible from a front passenger seat or other seat in the occupant compartment. It may be assumed from user manual activation of the system that an actual, current threat is perceived by the user. Thus, the fuel-level display control system may be configured so that the control signal is automatically generated (in block 212) (for example, by the threat detection module 124 or the fuel-level display control module 117) immediately after any manual activation of the fuel-level display control system.

After manual activation of the system, the threat-detection module may also (in block 217) cause at least one vehicle sensor to scan the occupant compartment of the vehicle for threats. Information from sensors may then be included in the generation of an informational signal (block 218) as previously described. In addition, responsive to the manual system activation and the resultant control signal generation, blocks 214, 215, 216, and 220 (along with later blocks as previously described) may be implemented.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling a fuel-level display in a vehicle, the system comprising:
   one or more processors; and
   a memory communicably coupled to the one or more processors and storing a threat detection module including computer-readable instructions that when executed by the one or more processors cause the one or more processors to:
   determine, using data from at least one scan of a vehicle occupant compartment by at least one vehicle sensor, a presence or absence of a potential threat to an occupant in the occupant compartment; and
   responsive to determination of the presence of a potential threat, cause a control signal to be generated;
   the memory also storing a fuel-level display control module including computer-readable instructions that when executed by the one or more processors cause the one or more processors to, responsive to the control signal, control operation of the vehicle so as to cause the fuel-level display to display a predetermined false low-fuel level.

2. The system of claim 1 wherein the threat detection module includes computer-readable instructions that when executed by the one or more processors cause the one or more processors to, responsive to manual activation of the system for controlling the fuel-level display in the vehicle, cause at least one vehicle sensor to scan an occupant compartment of the vehicle.

3. The system of claim 1 further comprising a user-operable system activation mechanism positioned in an occupant compartment of the vehicle and configured to be operable to manually activate the system for controlling the fuel-level display in the vehicle, and wherein the system for controlling the fuel-level display in the vehicle is configured to cause generation of the control signal responsive to manual activation of the system for controlling the fuel-level display in the vehicle.

4. The system of claim 1 wherein the fuel-level display control module includes computer-readable instructions that when executed by the one or more processors cause the one or more processors to, responsive to generation of the control signal, cause generation of an audible alert configured to indicate that the fuel-level display is displaying the predetermined false low-fuel level.

5. The system of claim 1 wherein the fuel-level display control module includes computer-readable instructions that when executed by the one or more processors cause the one or more processors to, responsive to generation of the control signal, cause generation of a request to a navigation system to locate a re-fueling point geographically closest to a current geographical location of the vehicle.

6. The system of claim 1 wherein the fuel-level display control module includes computer-readable instructions that when executed by the one or more processors cause the one or more processors to, responsive to generation of the control signal, cause generation and transmission of an informational signal to an extra-vehicular location.

7. The system of claim 1 wherein the fuel-level display control module includes computer-readable instructions that when executed by the one or more processors cause the one or more processors to, responsive to generation of the control signal, cause generation and transmission of a vehicle tracking signal to an extra-vehicular location.

8. The system of claim 1, wherein the system is also configured to generate the control signal responsive to manual activation of the system, and wherein the fuel-level display control module includes computer-readable instructions that when executed by the one or more processors cause the one or more processors to, responsive to the control signal generated by manual activation of the system, control operation of the vehicle so as to cause the fuel-level display to display the predetermined false low-fuel level.

9. A method of controlling a vehicle fuel-level display comprising a step of, responsive to a determination of the presence of a potential threat by a threat-detection module, controlling operation of a vehicle so as to cause the fuel-level display to display a predetermined false low-fuel level.

10. The method of claim 9 further comprising a step of, responsive to generation of the control signal, causing generation and transmission of an informational signal to an extra-vehicular location.

11. The method of claim 9, wherein the method further comprises a step of controlling the fuel-level display responsive to a control signal generated by manually activating a system for controlling a fuel-level display in a vehicle and without using the threat-detection module.

12. A system for controlling a fuel-level display in a vehicle, the system comprising:
   one or more processors;
   a memory communicably coupled to the one or more processors and storing a fuel-level display control module including computer-readable instructions that when executed by the one or more processors cause the one or more processors to, responsive to generation of a control signal, control operation of the vehicle so as to cause the fuel-level display to display a predetermined false low-fuel level; and a threat detection module including computer-readable instructions that when executed by the one or more processors cause the one or more processors to:
  determine, using data from at least one scan of a vehicle occupant compartment by at least one vehicle sensor, a presence or absence of a potential threat to an occupant in the occupant compartment; and
  responsive to determination of the presence of a threat, cause the control signal to be generated.

* * * * *